United States Patent
Kato et al.

(10) Patent No.: US 10,749,604 B2
(45) Date of Patent: Aug. 18, 2020

(54) OPTICAL PHASE DISTORTION COMPENSATING DEVICE AND METHOD OF COMPENSATING OPTICAL PHASE DISTORTION

(71) Applicant: FUJITSU LIMITED, Kawasaki-shi, Kanagawa (JP)

(72) Inventors: Tomoyuki Kato, Yokohama (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/457,250

(22) Filed: Jun. 28, 2019

(65) Prior Publication Data

US 2019/0326999 A1    Oct. 24, 2019

Related U.S. Application Data

(63) Continuation of application No. PCT/JP2017/046499, filed on Dec. 25, 2017.

(30) Foreign Application Priority Data

Jan. 4, 2017    (JP) ................................. 2017-000282

(51) Int. Cl.
    *H04B 10/556*      (2013.01)
    *H04B 10/2557*     (2013.01)
    *H04J 14/02*        (2006.01)

(52) U.S. Cl.
    CPC ..... *H04B 10/5561* (2013.01); *H04B 10/2557* (2013.01); *H04J 14/02* (2013.01)

(58) Field of Classification Search
None
See application file for complete search history.

(56) References Cited

U.S. PATENT DOCUMENTS

2010/0221013 A1    9/2010   Doi et al.

FOREIGN PATENT DOCUMENTS

| JP | 06-132895 | 5/1994 |
| JP | H06132895 A | * 5/1994 |

(Continued)

OTHER PUBLICATIONS

International Search Report attached with the Written Opinion with partial translation, mailed in connection with PCT/JP2017/046499 and dated Mar. 6, 2018, with partial English translation (15 pages).

*Primary Examiner* — David W Lambert
(74) *Attorney, Agent, or Firm* — Fujitsu Patent Center

(57) ABSTRACT

A compensating device includes at least one detector configured to detect intensity variation of the optical signal, at least one filter configured to extract a band where most of the optical phase distortion is generated from a component of the intensity variation of the optical signal, a control circuit configured to generate, based on the extraction with the at least one filter, a compensation signal exhibiting temporal intensity variation of the input optical signal, at least one compensation signal light source configured to output, based on the compensation signal of a controller, a compensation signal light exhibiting intensity variation in opposite phase to the temporal intensity variation of the input optical signal and having a different wavelength from a wavelength of the optical signal and an optical multiplexer configured to output to a transmission path a signal light formed by combining the optical signal and the compensation signal light.

11 Claims, 12 Drawing Sheets

(56) References Cited

FOREIGN PATENT DOCUMENTS

| JP | 07-058699 | 3/1995 | |
|----|-----------|--------|---|
| JP | 08-125605 | 5/1996 | |
| JP | 2007-189402 | 7/2007 | |
| WO | 2009/013795 | 1/2009 | |
| WO | WO-2015001656 A1 * | 1/2015 | ....... H04B 10/50575 |

* cited by examiner

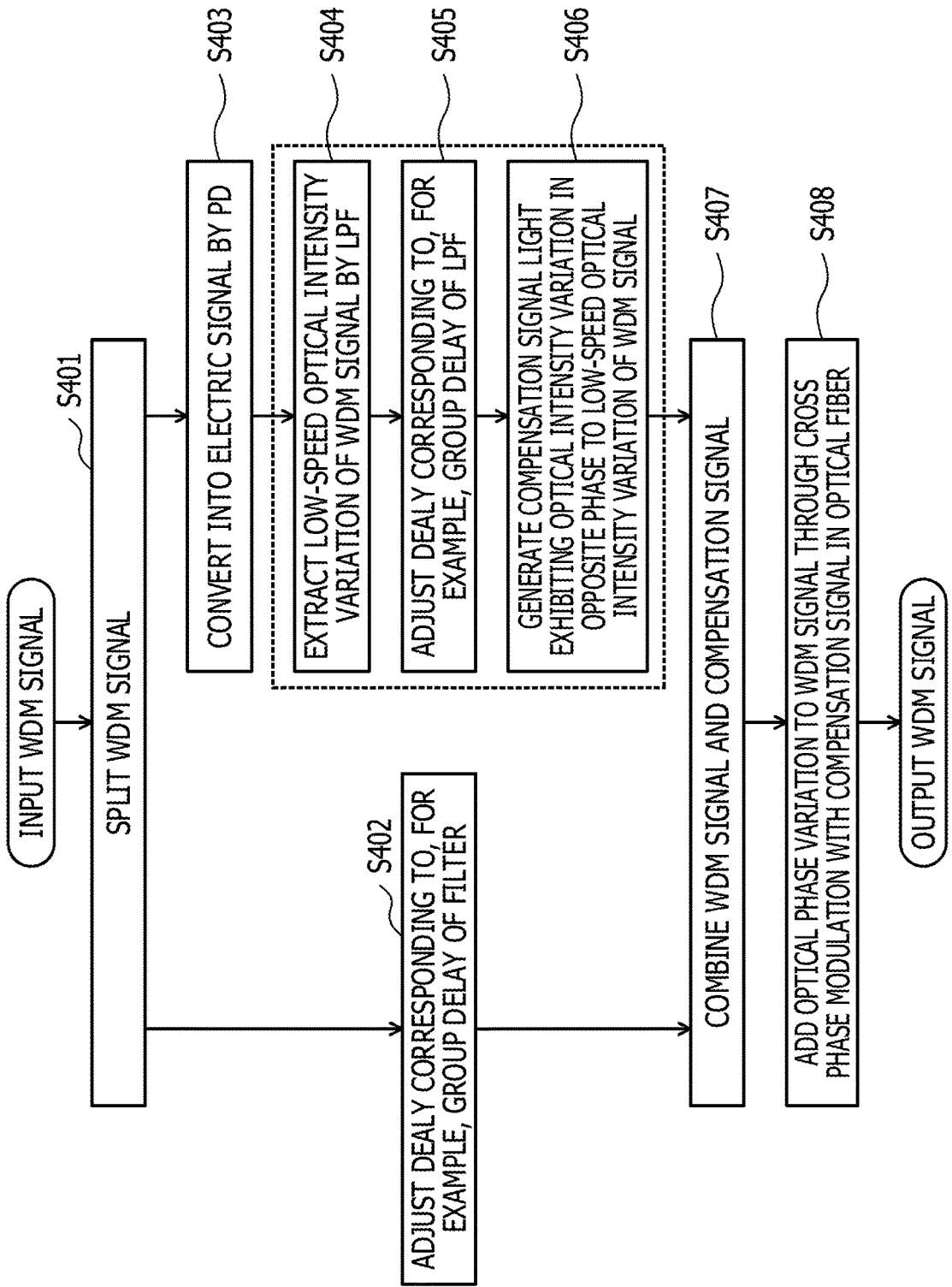

SET BETWEEN WDM CHANNELS

SET AT EMPTY WDM CHANNEL

SET ON SHORT WAVELENGTH SIDE OUTSIDE COMMUNICATION WAVELENGTH BAND

SET ON LONG WAVELENGTH SIDE OUTSIDE COMMUNICATION WAVELENGTH BAND

OPTICAL PHASE DISTORTION COMPENSATING DEVICE AND METHOD OF COMPENSATING OPTICAL PHASE DISTORTION

CROSS-REFERENCE TO RELATED APPLICATION

This application is a continuation application of International Application PCT/2017/046499 filed on Dec. 25, 2017 and designated the U.S., the entire contents of which are incorporated herein by reference. The International Application PCT/JP2017/046499 is based upon and claims the benefit of priority of the prior Japanese Patent Application No. 2017-000282, filed on Jan. 4, 2017, the entire contents of which are incorporated herein by reference.

FIELD

The embodiments discussed herein are related to an optical phase distortion compensating device and a method of compensating optical phase distortion that compensate the optical phase distortion occurring in a transmission path.

BACKGROUND

Wavelength-division multiplex (WDM) communication enables transmission paths to increase the transmission capacity thereof due to reduction in wavelength spacing and the number of optical signals input thereto. As the number of optical signals increases and the wavelength spacing reduces, optical phase distortion due to cross phase modulation occurring in the transmission paths increases. Thus, it is difficult to achieve both the increase in transmission capacity and an increase in transmission distance at the same time. When optical phase distortion occurring in the transmission paths is able to be compensated, optical signals with an increased transmission capacity are able to be transmitted over a long distance.

FIG. 12 illustrates optical phase distortion occurring in a transmission path. In FIG. 12, (a) illustrates an example of time and optical intensity characteristics of a wavelength-division multiplexing optical signal (WDM signal). Intensity variation of the WDM signal is some gigahertz (GHz), and a modulation component is tens of GHz. When the WDM signal illustrated in (b) of FIG. 12 (wavelength and optical intensity characteristics) is input to a transmission path D, a WDM signal similar to the WDM signal illustrated in (b) of FIG. 12 is output as illustrated in (c) of FIG. 12. Here, low-speed intensity variation (some GHz) exhibited by the WDM signal causes optical phase distortion in the transmission path D, and the WDM signal (of a receiving side) output from the transmission path D has, as illustrated in time and optical phase distortion characteristics in (d) of FIG. 12, an optical phase distortion component that varies over time.

There exists a related-art technique for compensating optical phase distortion. With this technique, optical phase distortion is compensated by bifurcating an optical signal degraded in a transmission path, inputting one of the bifurcated optical signal to a lithium niobate (LN; LiNbO$_3$) phase modulator, and controlling the LN phase modulator in accordance with output of another photoreceiver. Optical phase distortion is able to be compensated at, for example, a transmitting end, a receiving end, and repeating points for the optical signal. Compensating devices are provided at a poststage of a transmitter at the transmitting end, at a prestage of a receiver at the receiving end, and at poststages of optical amplifiers of the repeaters at the repeating points.

As the related art, for example, Japanese Laid-open Patent Publication Nos. 07-58699 and 2007-189402 are disclosed.

With the related art technique, optical phase distortion occurring in a wide transmission band (for example, the C band) is not able to be compensated. With the related art, to address comparatively low-speed intensity variation of the above-described wavelength-division multiplexed optical signal, optical phase distortion due to cross phase modulation is compensated by phase modulation performed on the optical signal. In this case, the following problems arise.

1. The existing phase modulator causes a large insertion loss and has a large polarization dependence.
2. The amount of compensation is small when optical phase distortion occurring in a distributed manner in the transmission path is compensated by the phase modulator.

When optical phase distortion is compensated with the phase modulator, additional insertion loss occurs due to installation of the phase modulator. Furthermore, since the compensation is performed in terms of a lumped constant, phase distortion varying and occurring in a distributed manner is compensated partially. Furthermore, to adjust the modulation index, it is required that phases after the modulation with the phase modulator be monitored. Thus, the configuration becomes complex.

In view of the above description, it is desired that optical phase distortion occurring in a wide transmission band be able to be compensated with a simple configuration and small additional loss.

SUMMARY

According to an aspect of the embodiments, an apparatus includes a compensating device includes at least one detector configured to detect intensity variation of the optical signal, at least one filter configured to extract a band where most of the optical phase distortion is generated from a component of the intensity variation of the optical signal, a control circuit configured to generate, based on the extraction with the at least one filter, a compensation signal exhibiting temporal intensity variation of the input optical signal, at least one compensation signal light source configured to output, based on the compensation signal of a controller, a compensation signal light exhibiting intensity variation in opposite phase to the temporal intensity variation of the input optical signal and having a different wavelength from a wavelength of the optical signal and an optical multiplexer configured to output to a transmission path a signal light formed by combining the optical signal and the compensation signal light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a flowchart illustrating a process for compensating optical phase distortion performed by the optical phase distortion compensating device according to the second embodiment;

DESCRIPTION OF EMBODIMENTS

According to embodiments to be described below, intensity variation of a wavelength-division multiplexed optical signal (WDM signal) is detected, a compensation signal light exhibiting intensity variation in opposite phase to the optical signal is generated, the WDM signal is combined with the compensation signal light, thereby optical phase distortion of the WDM signal after transmission through a transmission path (for example, an optical fiber) is compensated. In so doing, the optical phase distortion is compensated without the occurrences of additional loss such as insertion loss in the WDM signal. In the following description, the optical signal is the same as the WDM signal.

Optical phase distortion is able to be compensated at, for example, a transmitting end, a receiving end, and a relay point for the optical signal. An optical phase distortion compensating device is able to be provide at a poststage of a transmitter at the transmitting end, at a prestage of a receiver at the receiving end, and at a poststage of an optical amplifier of the repeater at the repeating point. The embodiments described in the following are examples in which the optical phase distortion compensating device is applied to a repeater.

First Embodiment

Figure 1:
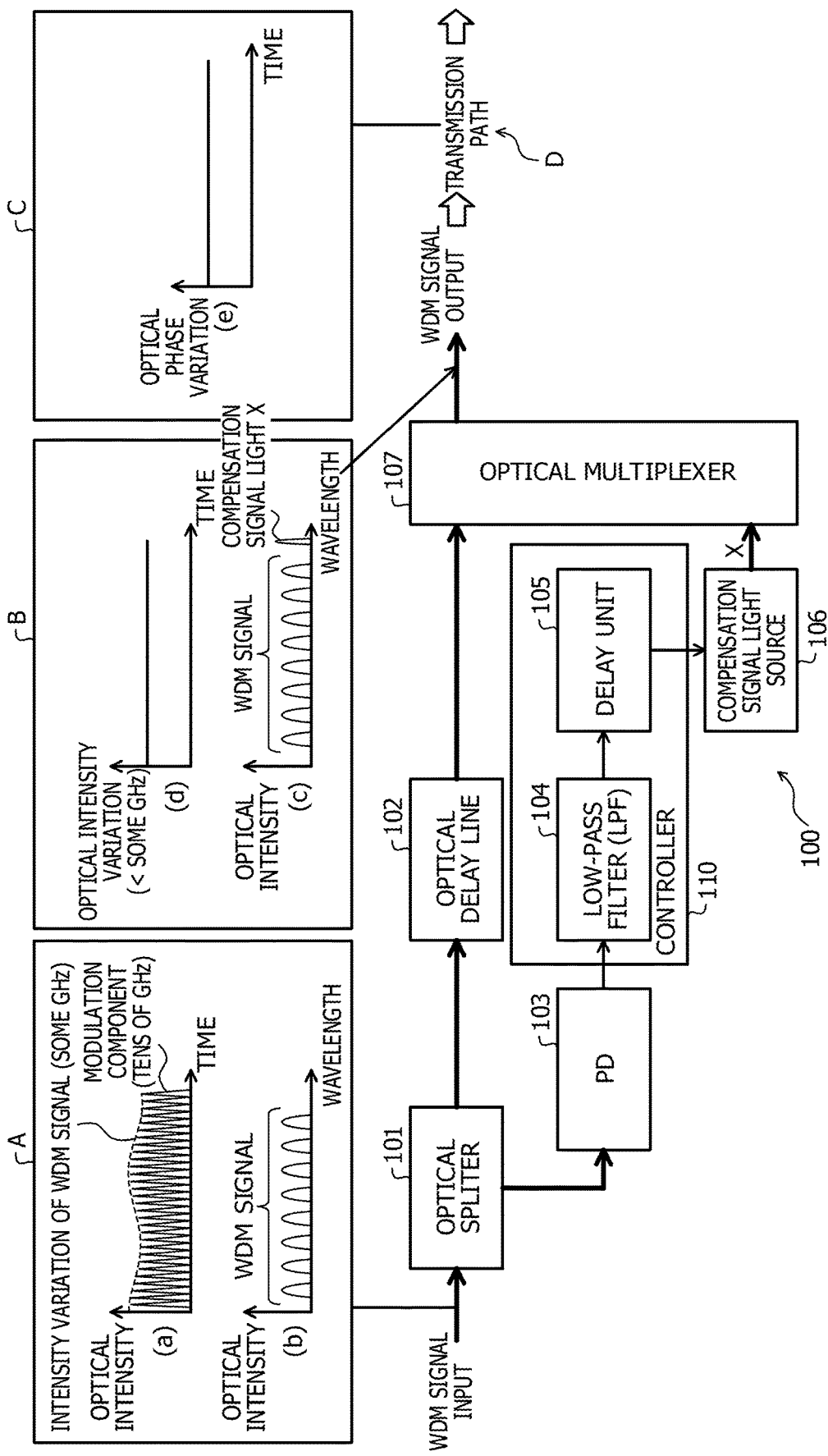
FIG. 1 illustrates an exemplary configuration of an optical phase distortion compensating device according to a first embodiment.

FIG. 1 illustrates an exemplary configuration of an optical phase distortion compensating device according to a first embodiment. An optical phase distortion compensating device 100 includes an optical splitter 101, an optical delay line 102, a photodetector (PD) 103, a low-pass filter (LPF) 104, a delay unit 105, a compensation signal light source 106, and an optical multiplexer 107. The LPF 104 and the delay unit 105 function as a controller 110 that handles electric signals.

Figure 12:
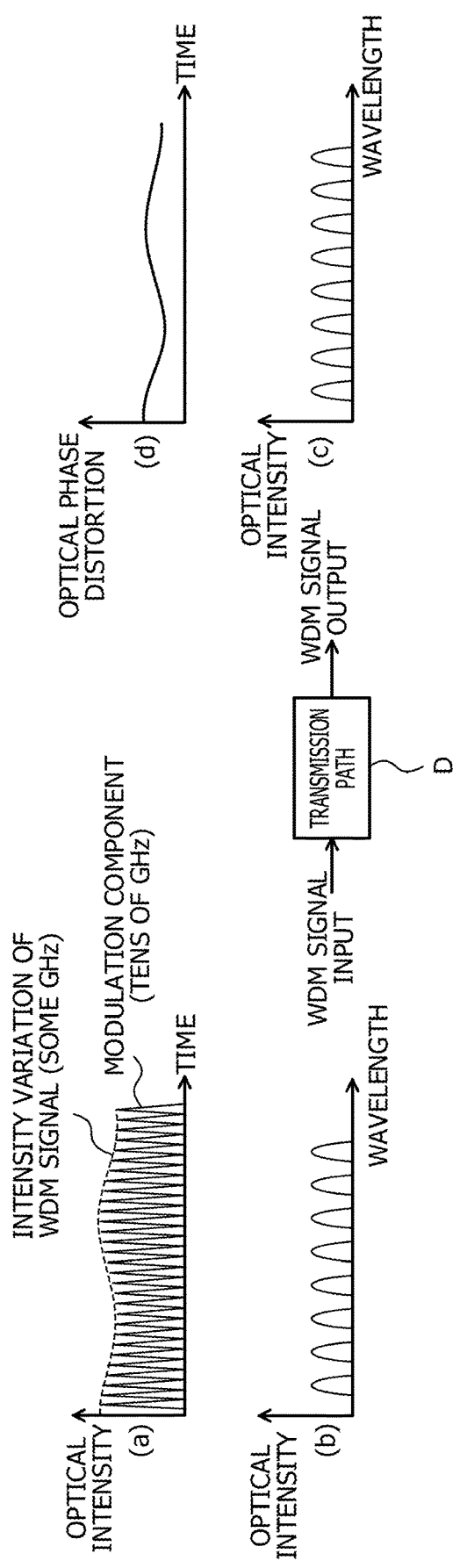
FIG. 12 illustrates optical phase distortion occurring in a transmission path.

A to C of FIG. 1 include waveform diagrams of a WDM signal at various points as follows. A includes waveform diagrams of the WDM signal input to the device. Out of these, (a) illustrates time and optical intensity characteristics of the WDM signal, and (b) illustrates wavelength and optical intensity characteristics of the WDM signal (similar to (a) and (b) of FIG. 12). B includes output waveform diagrams of the optical multiplexer 107. Out of these, (c) illustrates wavelength and optical intensity characteristics of the WDM signal (the same as (c) of FIG. 12), and (d) illustrates time and optical intensity variation characteristics of the WDM signal. C is a waveform diagram in a transmission path D, illustrating time and optical phase variation characteristics of the WDM signal.

The WDM signal exhibiting intensity variation (some gigahertz (GHz)) and having a modulation component of tens of GHz illustrated in the wavelength and optical intensity characteristics of (a) of A in FIG. 1 is, for example, input to the optical splitter 101 through the transmission path D. The optical splitter 101 bifurcates the WDM signal input thereto. For one of the bifurcated WDM signals, the optical delay line 102 is provided. For example, an optical fiber is used as for the optical delay line 102. The optical delay line 102 outputs the WDM signal to the optical multiplexer 107 with a predetermined delay amount corresponding to the delay amount of, for example, the LPF 104 for the other bifurcated signal.

The PD 103 provided for the other bifurcated WDM signal bifurcated by the optical splitter 101 converts the WDM signal into an electric signal and outputs the converted signal to the LPF 104. The LPF 104 extracts components of frequencies (some GHz; corresponding to a frequency band where most of optical phase distortion is generated) of the optical intensity variation of the input WDM signal. The delay unit 105 adjusts the delay amount corresponding to group delay that the LPF 104 has and outputs a compensation signal. The LPF 104 and the delay unit 105 that function as the controller 110 causes a compensation signal light to be generated. This compensation signal light has a different wavelength from those in the wavelength band of the WDM signal exhibiting intensity variation limited by the LPF 104.

Based on an opposite phase compensation signal generated by using an inverting amplifier or the like from the compensation signal input from the delay unit 105, the compensation signal light source 106 generates a compensation signal light X exhibiting optical intensity variation in opposite phase to the optical intensity variation of low speed (some GHz) exhibited by the WDM signal input to the device. The compensation signal light X is generated by directly modulating the light source with an opposite phase compensation signal or modulating output of a continuously oscillating light source with an opposite phase compensation signal by using an external modulator. For example, the compensation signal light X is set outside a communication wavelength band of the WDM signal as illustrated in (c) of B of FIG. 1 (exemplary settings will be described later).

The optical multiplexer 107 combines the WDM signal of the optical delay line 102 for the one bifurcated signal and the compensation signal light X of the compensation signal light source 106 for the other bifurcated signal and outputs to the transmission path D outside the device the WDM signal combined with the compensation signal light source 106.

Out of the elements illustrated in FIG. 1, the LPF 104 and the delay unit 105, which function as the controller 110 and handle electric signals, are able to be configured with a field-programmable gate array (FPGA) or an analog circuit having these functions. Furthermore, the LPF 104 and the delay unit 105 are also able to be configured with hardware such as a central processing unit (CPU) and memory. In this case, it is required that an analog to digital (AD) converter and a digital to analog (DA) converter be provided at an input portion from the PD 103 and an output portion for the compensation signal light source 106. When the CPU is used, the above-described functions are able to be realized by executing a program stored in the memory. In so doing, part of the memory is used as a work space.

Figure 2:
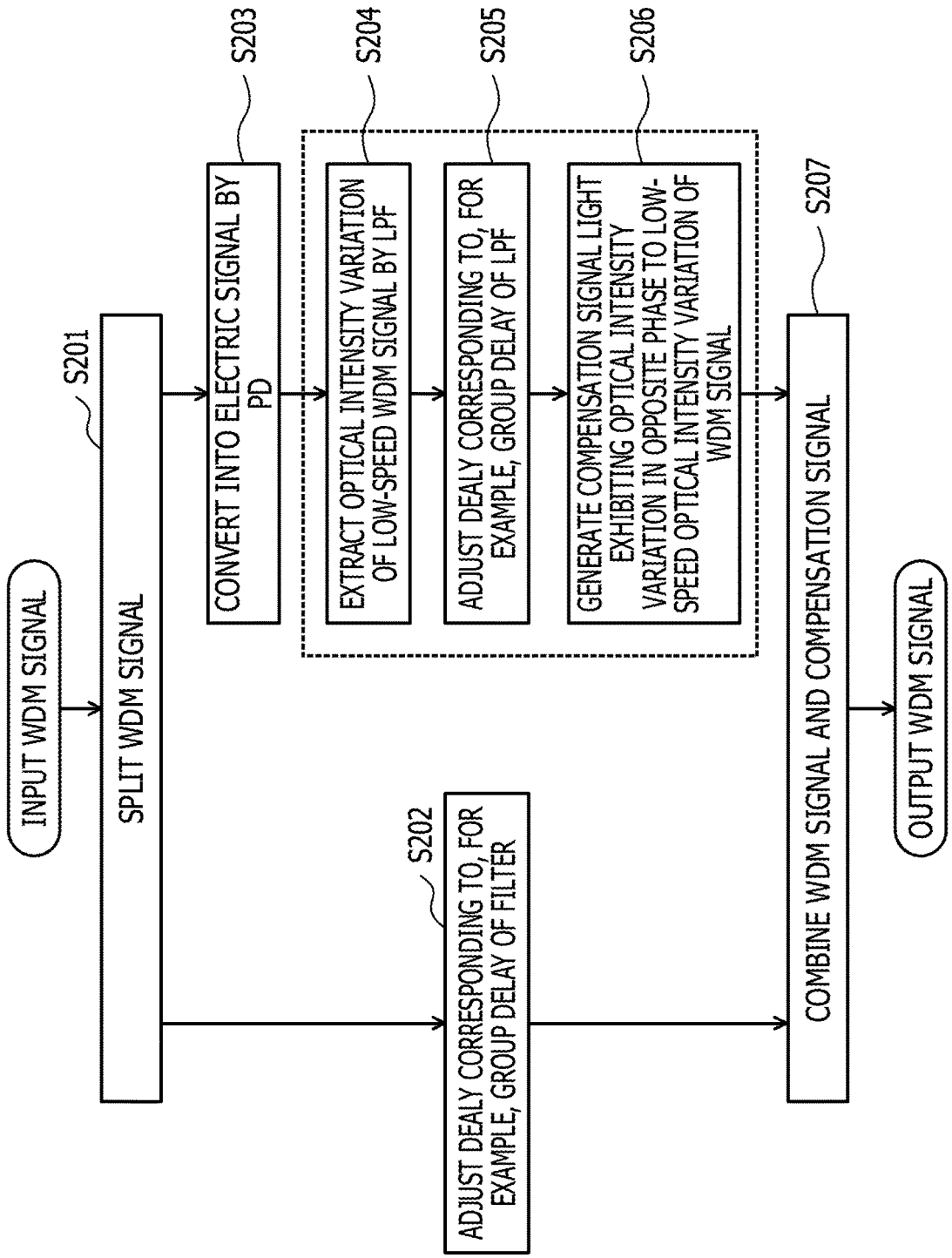
FIG. 2 is a flowchart illustrating a process for compensating optical phase distortion performed by the optical phase distortion compensating device according to the first embodiment.

FIG. 2 is a flowchart illustrating a process for compensating optical phase distortion performed by the optical phase distortion compensating device according to the first embodiment. FIG. 2 illustrates operations corresponding to the configuration illustrated in FIG. 1. First, the WDM signal input to the device is bifurcated by the optical splitter 101 (step S201). The delay of one of the bifurcated WDM signals corresponding to the group delay of the filter (such as an LPF 104) is adjusted by the optical delay line 102, and this WDM signal is output to the optical multiplexer 107 (step S202).

The other bifurcated WDM signal is converted into the electric signal by the PD 103 (step S203) and output to the LPF 104. The LPF 104 extracts the low-speed optical intensity variation of the WDM signal (step S204) and outputs the extracted optical intensity variation to the delay unit 105. The delay unit 105 adjusts the delay corresponding to the group delay of the LPF 104 and outputs the compensation signal to the compensation signal light source 106 (step S205). Based on the opposite phase compensation signal generated by using an inverting amplifier or the like from the input compensation signal, the compensation signal light source 106 generates the compensation signal light X having optical intensity (intensity variation) in opposite phase to the low-speed optical intensity variation of the WDM signal and outputs the compensation signal light X to the optical multiplexer 107 (step S206). The controller 110 performs steps S204 to S206 by using electric signals.

The optical multiplexer 107 combines the WDM signal output from the optical delay line 102 for the one bifurcated signal and the compensation signal light X output from the compensation signal light source 106 based on the other bifurcated WDM signal and outputs to the transmission path D outside the WDM signal combined with the compensation signal light X (step S207).

The optical phase distortion compensating device 100 having the above-described configuration uses the transmission path D outside the device as a phase modulator. The optical phase distortion compensating device 100 generates the compensation signal light X that is to compensate optical phase distortion occurring in the transmission path D and transmits the generated compensation signal light X to the transmission path D. Optical phase distortion occurring due to transmission of the WDM signal is able to be suppressed by causing the WDM signal to generate optical phase distortion with the compensation signal light X in the transmission path D so as to compensate the optical phase distortion caused by the WDM signal in the transmission path D.

As has been described, the PD 103 detects intensity variation of the WDM signal input to the device, the compensation signal light source 106 generates the compensation signal light X exhibiting intensity variation in opposite phase to the optical signal, and the optical multiplexer 107 combines the WDM signal and the compensation signal light X. Thus, the optical intensity variation of the WDM signal output from the device is able to be suppressed (smaller than some GHz) as illustrated in (d) of B of FIG. 1, and optical phase variation (optical phase distortion) in the transmission path D is able to be suppressed as illustrated in (e) of C of FIG. 1.

According to the first embodiment, the transmission path such as an optical fiber is able to be used as the phase modulator, and optical phase distortion is able to be compensated in terms of a distributed constant by optical modulation with an optical fiber. Thus, insertion loss may be reduced and optical phase distortion occurring in transmission signals may be effectively compensated.

Second Embodiment

Figure 3:
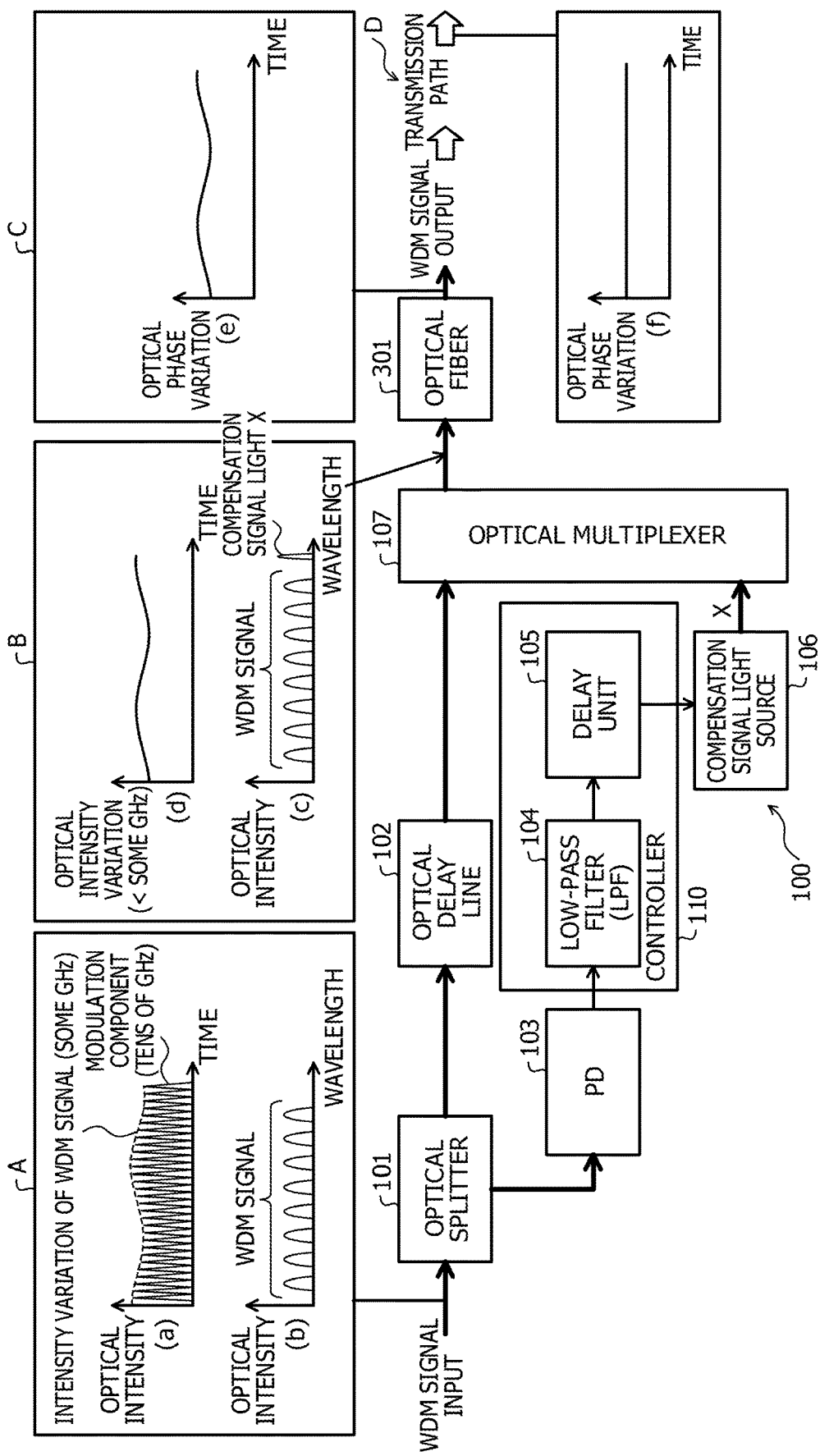
FIG. 3 illustrates an exemplary configuration of the optical phase distortion compensating device according to a second embodiment.

FIG. 3 illustrates an exemplary configuration of the optical phase distortion compensating device according to a second embodiment. Elements of the second embodiment that are the same as the elements of the first embodiment (FIG. 1) are denoted by the same reference signs. According to the second embodiment, the optical phase distortion compensating device 100 outputs a WDM signal to the transmission path D through an optical fiber 301 (nonlinear optical medium using a high refractive index difference waveguide or a high nonlinear coefficient medium).

FIG. 4 is a flowchart illustrating a process for compensating optical phase distortion performed by the optical phase distortion compensating device according to the second embodiment. FIG. 4 illustrates operations corresponding to the configuration illustrated in FIG. 3. First, the WDM signal input to the optical phase distortion compensating device 100 is bifurcated by the optical splitter 101 (step S401). The delay of one of the bifurcated WDM signals corresponding to the group delay of the filter (such as an LPF 104) is adjusted by the optical delay line 102, and this WDM signal is output to the optical multiplexer 107 (step S402).

The other bifurcated WDM signal is converted into the electric signal by the PD 103 (step S403) and output to the LPF 104. The LPF 104 extracts the low-speed optical intensity variation of the WDM signal (step S404) and outputs the optical intensity variation to the delay unit 105. The delay unit 105 adjusts the delay corresponding to the group delay of the LPF 104 and outputs the compensation signal to the compensation signal light source 106 (step S405). Based on the opposite phase compensation signal generated by using an inverting amplifier or the like from the input compensation signal, the compensation signal light source 106 generates the compensation signal light X having optical intensity (intensity variation) in opposite phase to the low-speed optical intensity variation of the WDM signal and outputs the compensation signal light X to the optical multiplexer 107 (step S406). The controller 110 performs steps S404 to S406 by using electric signals.

The optical multiplexer 107 combines the WDM signal output from the optical delay line 102 for the one bifurcated signal and the compensation signal light X output from the compensation signal light source 106 based on the other bifurcated WDM signal and outputs to the optical fiber 301 the WDM signal combined with the compensation signal light X (step S407). The optical fiber 301 adds optical phase variation to the WDM signal through cross phase modulation therein with the compensation signal light X and outputs the WDM signal to the transmission path D outside the device (step S408).

The optical phase distortion compensating device 100 having the above-described configuration uses the optical fiber 301 within the device as a phase modulator. The optical phase distortion compensating device 100 generates the compensation signal light X that is to compensate optical phase distortion occurring in the transmission path D and transmits the generated compensation signal light X to the optical fiber 301. Optical phase distortion caused due to transmission of the WDM signal in the transmission path D is able to be suppressed by generating optical phase distortion by the compensation signal light X in the optical fiber 301 within the device so as to compensate the optical phase distortion caused by the WDM signal in the transmission path D.

The WDM signal including the compensation signal light X output from the optical phase distortion compensating device 100 is, as illustrated in (d) of B of FIG. 3, in opposite phase to the WDM signal (a) input to the optical phase distortion compensating device 100. As illustrated in (e) of C of FIG. 3, optical phase distortion is generated due to the cross-phase modulation in the optical fiber 301. Thus, optical phase variation (optical phase distortion) in the transmission path D is able to be suppressed as illustrated in (f) of FIG. 3.

According to the second embodiment, the nonlinear optical medium such as an optical fiber is provided in the device so as to generate optical phase distortion in terms of a distributed constant by the optical modulation with an optical fiber. Thus, the WDM signal with suppressed optical phase distortion is output to the transmission path. Also according to the second embodiment, insertion loss may be reduced and optical phase distortion occurring in transmission signals may be effectively compensated.

FIGS. 5A to 5D illustrate exemplary settings of the compensation signal light used for the embodiments. The frequency (wavelength) of the compensation signal light X is able to be set to various values with which the WDM signal is not influenced.

Figure 5A:
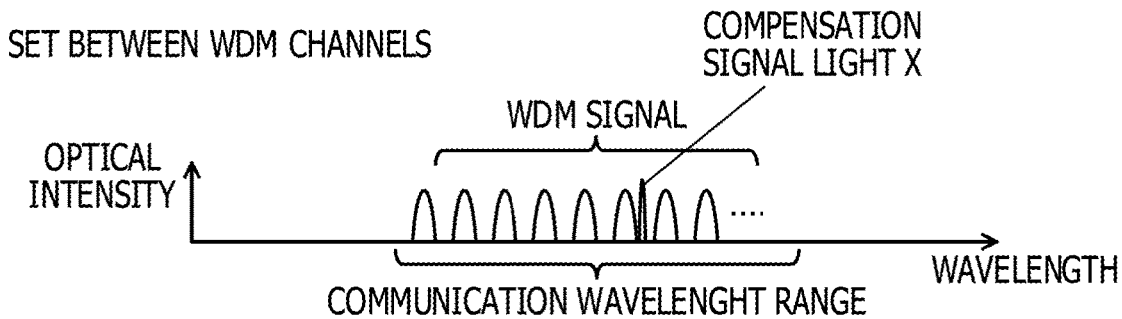
FIGS. 5A to 5D illustrate exemplary settings of the compensation signal light use for the embodiments.
Figure 5B:
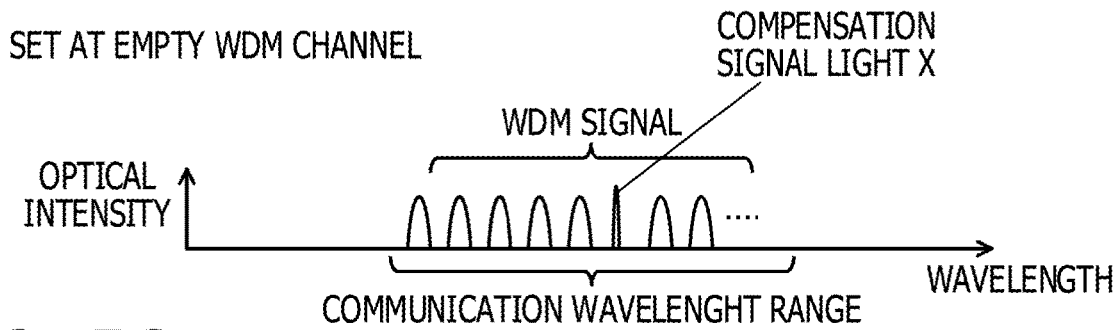
Figure 5C:
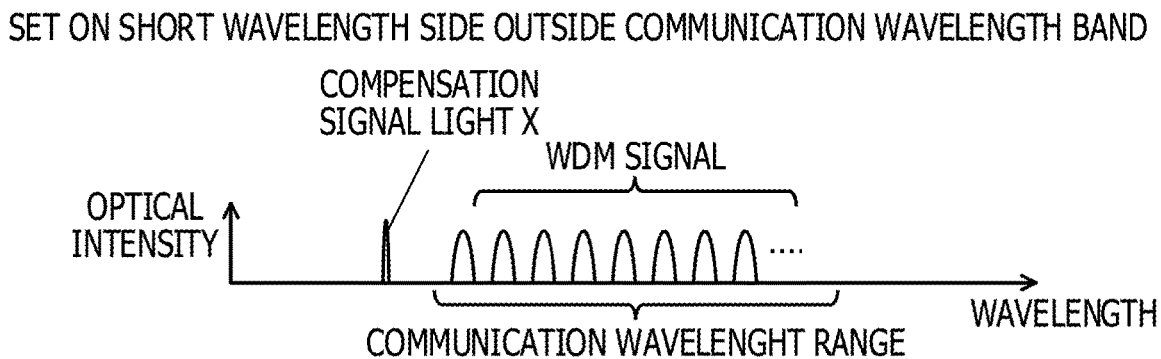
Figure 5D:
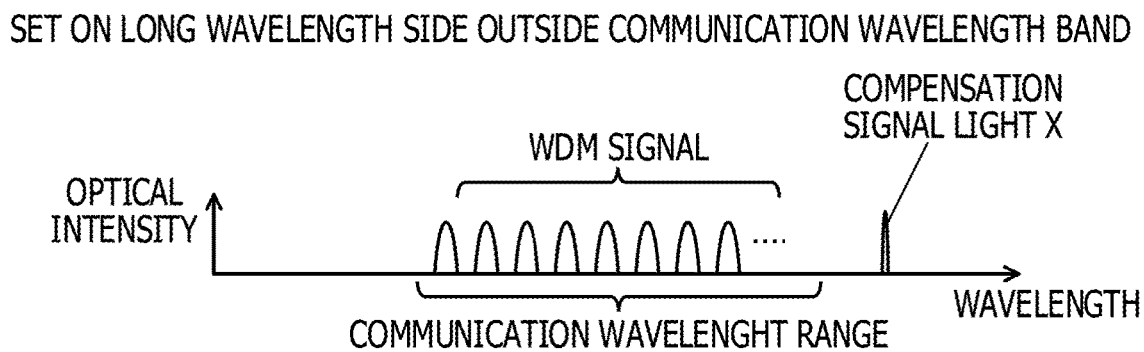

For example, as illustrated in FIG. 5A, the compensation signal light X is able to be set between channels of the WDM signal in the communication wavelength band. Alternatively, as illustrated in FIG. 5B, the compensation signal light X is able to be set at an empty channel of the WDM signal. Alternatively, as illustrated in FIG. 5C, the compensation signal light X is able to be set on a short wavelength side outside the communication wavelength band (outside communication wavelength range) of the WDM signal. Alternatively, as illustrated in FIG. 5D, the compensation signal light X is able to be set on a long wavelength side outside the communication wavelength band (outside communication wavelength range) of the WDM signal.

Third Embodiment

Figure 6:
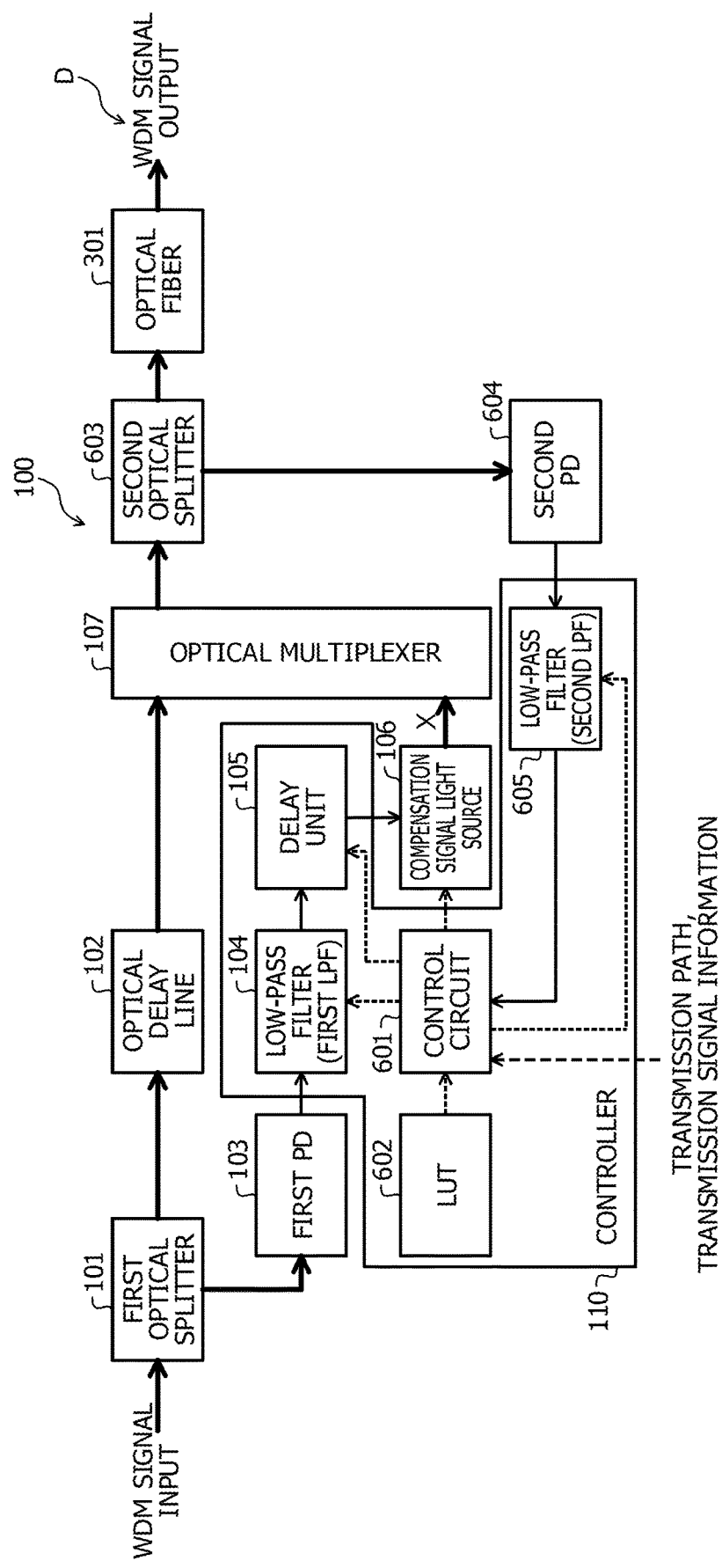
FIG. 6 illustrates an exemplary configuration of the optical phase distortion compensating device according to a third embodiment.

FIG. 6 illustrates an exemplary configuration of the optical phase distortion compensating device according to a third embodiment. According to the third embodiment, changes in the type or the like of the WDM signal and the optical intensity variation of the WDM signal in the transmission path D are addressed.

The controller 110 includes, in addition to the LPF 104 and the delay unit 105, a control circuit 601 and a look-up table (LUT) 602. Furthermore, a second optical splitter 603 is provided at a poststage of the optical multiplexer 107 between the optical multiplexer 107 and the optical fiber 301 so as to allow a second PD 604 to detect optical intensity. Output of the second PD 604 is input to the control circuit 601 of the controller 110 through a second LPF 605. Here, reference numerals 101, 103, and 104 respectively denote a first optical splitter, a first PD, and a first LPF. The LUT 602 is able to be configured by using, for example, memory. Settings are able to be stored and held in the memory.

The bandwidths of the LPF 104 and the LPF 605, the delay amount of the delay unit 105, and the wavelength and the amount of chirp of the compensation signal in accordance with the transmission path D and the type of the WDM signal to be transmitted are set in the LUT 602. The control circuit 601 monitors the WDM signal combined by the optical multiplexer 107 and the optical signal of the compensation signal light X from output of a feedback (FB) route between the second optical splitter 603 and the second LPF 605, thereby the control circuit 601 causes the intensity of the compensation signal light X to be adjusted. Also, the control circuit 601 refers to the settings in the LUT 602 to reset a variety of parameters of the compensation signal when the transmission path D through which the WDM signal passes varies (in loss or dispersion characteristics of the optical fiber) or the number of channels or the channel spacing of the WDM signal varies.

Figure 7:
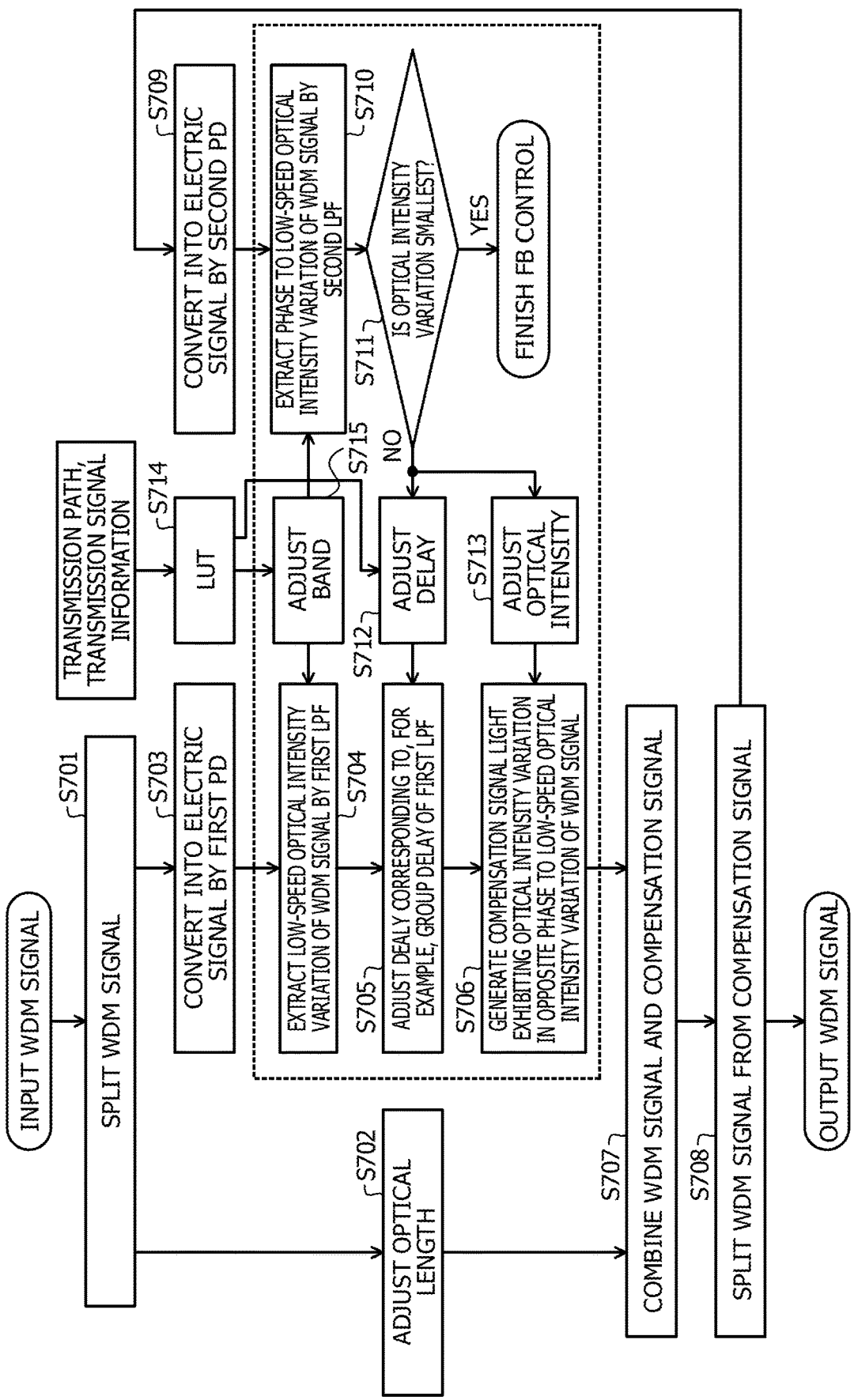
FIG. 7 is a flowchart illustrating a process for compensating optical phase distortion performed by the optical phase distortion compensating device according to the third embodiment.

FIG. 7 is a flowchart illustrating a process for compensating optical phase distortion performed by the optical phase distortion compensating device according to the third embodiment. FIG. 7 illustrates operations corresponding to the configuration illustrated in FIG. 6. First, the WDM signal input to the optical phase distortion compensating device 100 is bifurcated by the first optical splitter 101 (step S701). The delay of one of the bifurcated WDM signals corresponding to the group delay of the filter (first LPF 104) is adjusted by the optical delay line 102, and this WDM signal is output to the optical multiplexer 107 (step S702).

The other bifurcated WDM signal is converted into the electric signal by the first PD 103 (step S703) and output to the first LPF 104. The first LPF 104 extracts the low-speed optical intensity variation of the WDM signal (step S704) and outputs the optical intensity variation to the delay unit 105. The delay unit 105 adjusts the delay corresponding to the group delay of the first LPF 104 and outputs the compensation signal to the compensation signal light source 106 (step S705). Based on the opposite phase compensation signal generated by using an inverting amplifier or the like from the input compensation signal, the compensation signal light source 106 generates the compensation signal light X having optical intensity (intensity variation) in opposite phase to the low-speed optical intensity variation of the WDM signal and outputs the compensation signal light X to the optical multiplexer 107 (step S706). The controller 110 performs steps S704 to S706, S710, S711, S712, S713, and S715 by using electric signals.

The optical multiplexer 107 combines the WDM signal output from the optical delay line 102 for the one bifurcated signal and the compensation signal light X output from the compensation signal light source 106 based on the other bifurcated WDM signal and outputs to the optical fiber 301 the WDM signal combined with the compensation signal light X (step S707). The optical fiber 301 adds optical phase variation to the WDM signal due to cross phase modulation therein with the compensation signal light X and outputs the WDM signal to the transmission path D outside the device.

The WDM signal to be output from the optical phase distortion compensating device 100 is split by the second optical splitter 603 (step S708) and converted into an electric signal by the second PD 604 (step S709). Based on the output of the second PD 604, the second LPF 605 extracts low-speed optical intensity variation and outputs the extracted optical intensity variation to the control circuit 601 of the controller 110 (step S710).

The control circuit 601 determines whether the optical intensity variation input from the second LPF 605 is the smallest (step S711). The value of the optical intensity variation input from the second LPF 605 varies over time, and, for example, the control circuit 601 determines whether a variation value at this time is smaller than the previous variation value. If the value of the optical intensity variation is the smallest ("Yes" in step S711), the control circuit 601 finishes FB control. In contrast, if this value of the optical intensity variation is not the smallest (No in step S711), the control circuit 601 makes adjustment to the delay unit 105 for varying the delay amount (step S712) and makes adjustment to the compensation signal light source 106 for varying optical intensity (step S713).

In the next control, the delay amount in step S705 is adjusted by the adjustment in step S712, and the optical intensity of the compensation signal light X in step S706 is adjusted by the adjustment in S713.

Also, the control circuit 601 resets the LUT 602 when the transmission path D, through which the WDM signal passes from the outside of the optical phase distortion compensating device 100, varies or the number of channel or the channel spacing of the WDM signal varies (step S714). In so doing, the bandwidths of the parameters of the compensation signals (first LPF 104, second LPF 605; step S715), the delay amount of the delay unit 105 (step S712), and the optical intensity of the compensation signal light source 106 (step S713) set in the LUT 602 are reset. In the next control, the bandwidths of the first LPF 104 and the second LPF 605 in steps S704 and S710 are adjusted by the adjustment in step S715.

The similar operational effects obtained according to the first and second embodiments may be obtained according to the third embodiment. As is the case with the second embodiment, the nonlinear optical medium such as an optical fiber is provided in the device so as to generate optical phase distortion in terms of a distributed constant by the optical modulation with an optical fiber. Thus, the WDM signal with suppressed optical phase distortion is output to the transmission path.

In addition, according to the third embodiment, the feedback control is performed on the WDM signal to be output from the device, thereby performing control for suppressing the optical intensity variation of the WDM signal. Accordingly, the bandwidths of the LPFs, the delay amount, and the wavelength and the amount of chirp of the compensation signal light are adjusted in accordance with variation in the transmission path of the WDM signal or changes in the transmission signal such as variation in number of channels or the channel spacing of the transmission signal. Thus, the optical intensity variation (optical phase distortion) of the WDM signal may be suppressed. With the configuration in which the optical fiber for optical modulation is inserted at the prestage of the transmission path, zero dispersion of the optical fiber and the wavelength of the compensation signal light are adjusted. This may effectively compensate optical phase distortion.

Fourth Embodiment

Figure 8:
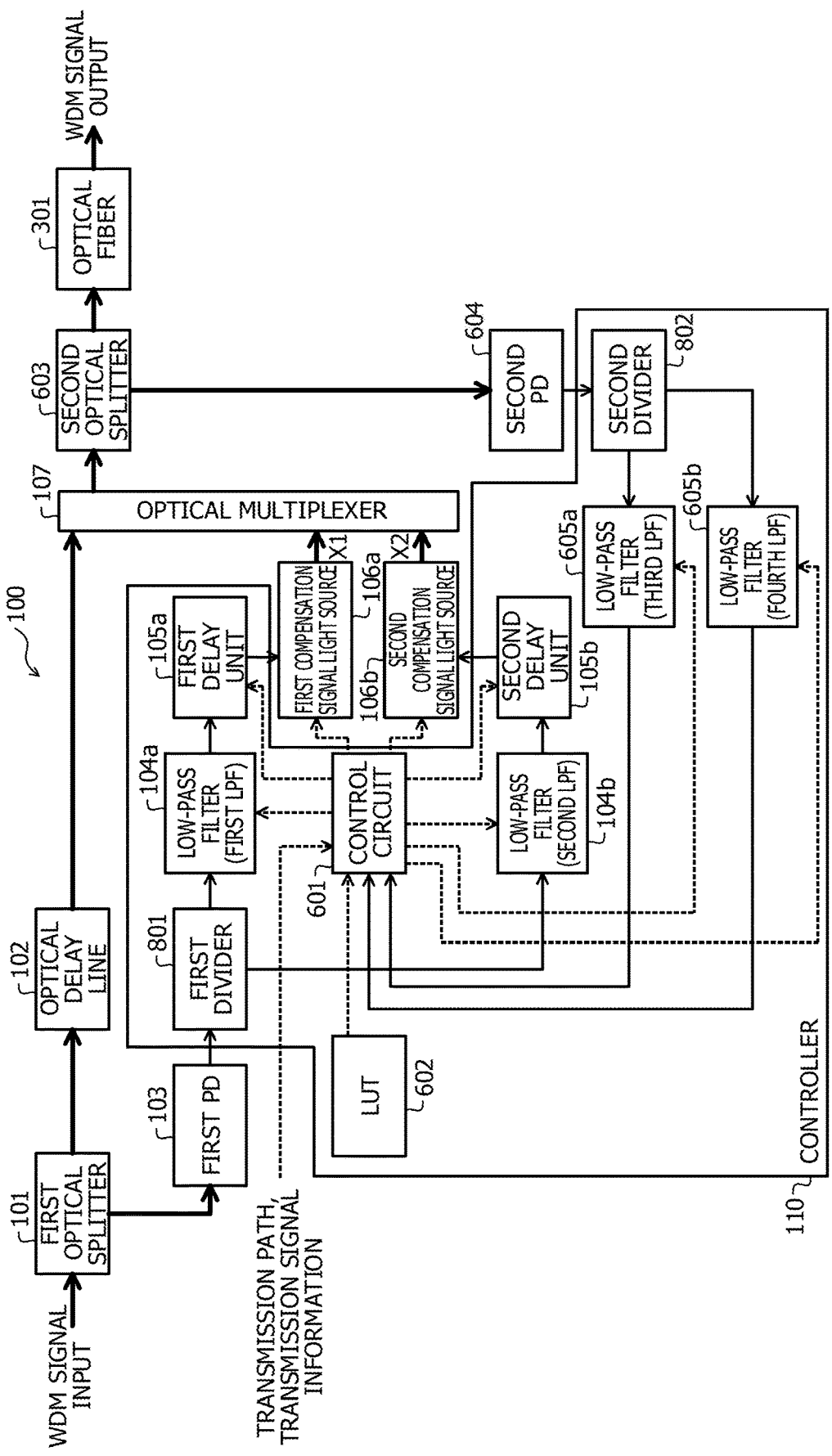
FIG. 8 illustrates an exemplary configuration of the optical phase distortion compensating device according to a fourth embodiment.

FIG. 8 illustrates an exemplary configuration of the optical phase distortion compensating device according to a fourth embodiment. According to the fourth embodiment, in addition to the third embodiment, control for low-speed optical intensity variation in the transmission path is performed so as to further reduce optical phase distortion.

Output of the first PD 103 is divided by a first divider 801 in the controller 110. One part of the divided outputs is output toward a first LPF 104*a*, and the other part of the divided output is output toward a second LPF 104*b*.

The transmission bands of the first LPF 104*a* for the one part of the divided output and the second LPF 104*b* for the other part of the divided output are the same or different from each other. In a route for the one part of the divided output, the one part of the divided output is delayed by a first delay unit 105*a* based on the transmission band of the first LPF 104*a*, and a compensation signal light X1 is output from a first compensation signal light source 106*a*. In a route for the other part of the divided output, the other part of the divided output is delayed by a second delay unit 105*b* based on the transmission band of the second LPF 104*b*, and a compensation signal light X2 having a different wavelength from the wavelength of the compensation signal light X1 is output from a second compensation signal light source 106*b*. For example, the first LPF 104*a* and the second LPF 104*b* have transmission characteristics corresponding to phase distortion of the entire WDM signal and transmission characteristics corresponding to phase distortion of a WDM signal from which every other period of the WDM signal is removed in the direction of the wavelength.

The controller 110 has two FB routes related to the generation of two compensation signal lights X1, X2. The controller 110 divides output of the second PD 604 by using a second divider 802. One part of the divided output is output to the control circuit 601 through a third LPF 605*a*, and the other part of the divided output is output to the control circuit 601 through a fourth LPF 605*b*. The third LPF 605*a* has the same transmission band as the transmission band of the first LPF 104*a*, and the fourth LPF 605*b* has the same transmission band as the transmission band of the second LPF 104*b*.

Figure 9A:
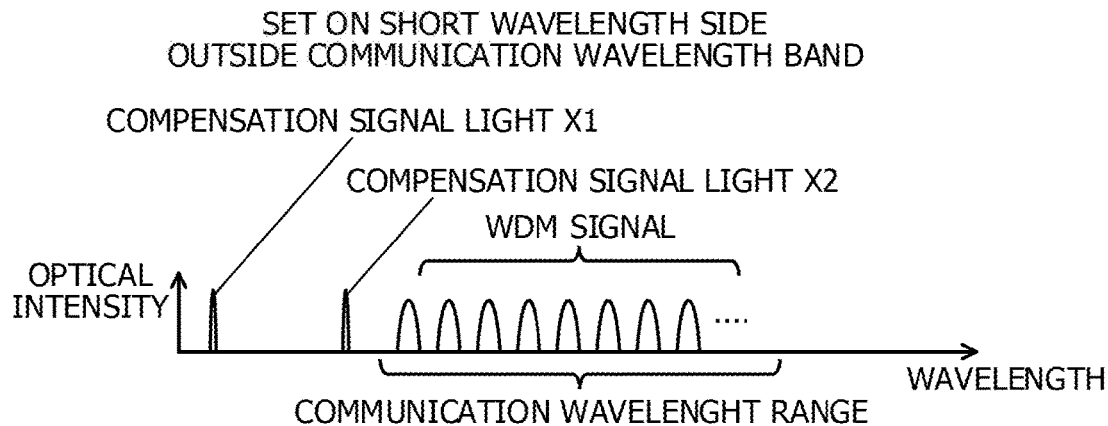
FIGS. 9A to 9C illustrate exemplary settings of two compensation signal lights according to the fourth embodiment.
Figure 9B:
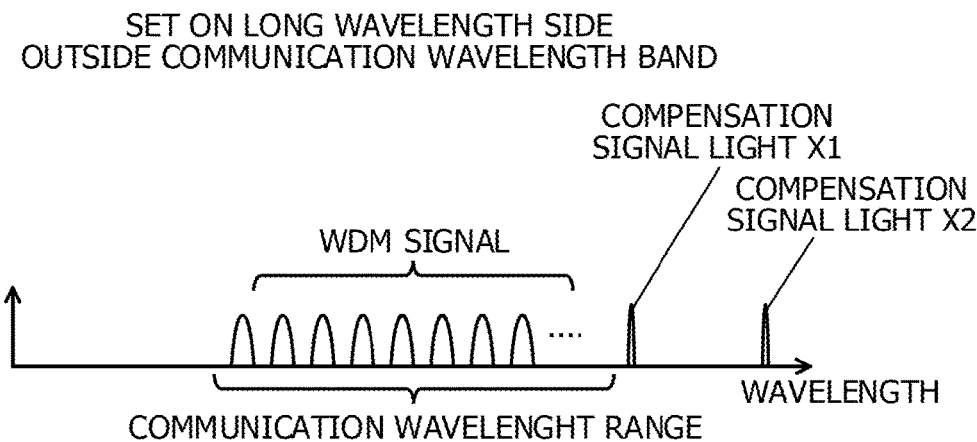
Figure 9C:
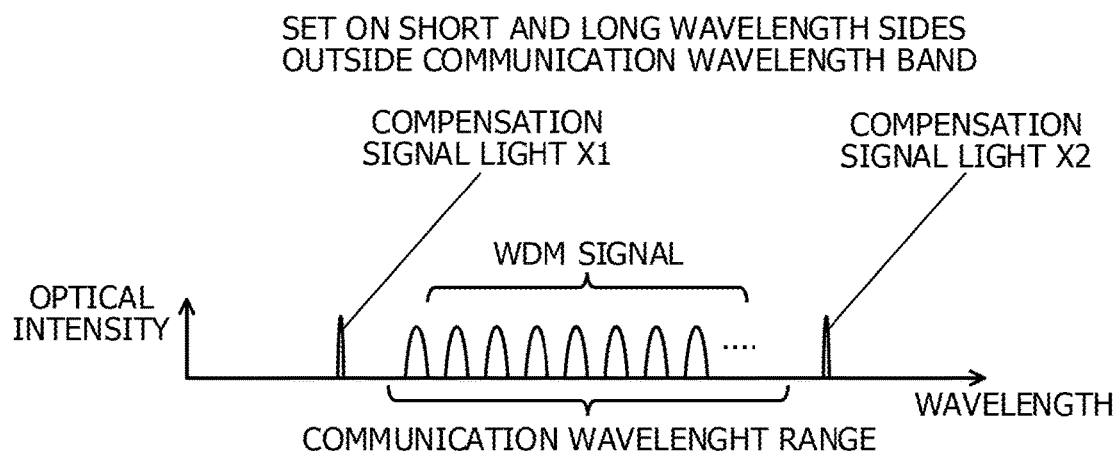

FIGS. 9A to 9C illustrate exemplary settings of two compensation signal lights according to the fourth embodiment. The frequencies (wavelengths) of the compensation signal lights X1, X2 are able to be set to various values with which the WDM signal is not influenced.

For example, as illustrated in FIG. 9A, both the compensation signal lights X1, X2 are able to be set on the short wavelength side outside the communication wavelength range (outside communication wavelength band) of the WDM signal. Alternatively, as illustrated in FIG. 9B, both the compensation signal lights X1, X2 are able to be set on the long wavelength side outside the communication wavelength band (outside communication wavelength range) of the WDM signal. Alternatively, as illustrated in FIG. 9C, the compensation signal lights X1, X2 are able to be set outside the communication wavelength band (outside communication wavelength range) of the WDM signal as follows: the compensation signal light X1 is set on the short wavelength side outside the communication wavelength range of the WDM signal; and the compensation signal light X2 is set on the long wavelength side outside the communication wavelength range of the WDM signal.

The similar operational effects obtained according to the first to third embodiments may be obtained according to the fourth embodiment. In addition, according to the fourth embodiment, the feedback control is performed on the WDM signal to be output from the device so as to suppress the optical intensity variation of the WDM signal, and further, two different compensation signal lights of different wavelengths are output by using two different LPFs of different transmission characteristics. For example, when the LPF is configured with an analog circuit, given transmission characteristics are not able to be obtained only with a single LPF. As a result, the characteristics of the intensity variation of the above-described WDM signal are not sufficiently addressed. However, as described above, when a plurality of LPFs are used and the compensation signal lights are combined, the characteristics of the intensity variation of the WDM signal are able to be addressed.

According to the fourth embodiment, to address a situation in which the low-speed optical intensity signal of the WDM signal is varied instead of being uniform in the transmission path, the compensation signal lights of different wavelengths is output, thereby the optical intensity variation is able to be varied by wavelength dispersion. This may further reduce optical phase distortion occurring in the transmission path.

Fifth Embodiment

Figure 10:
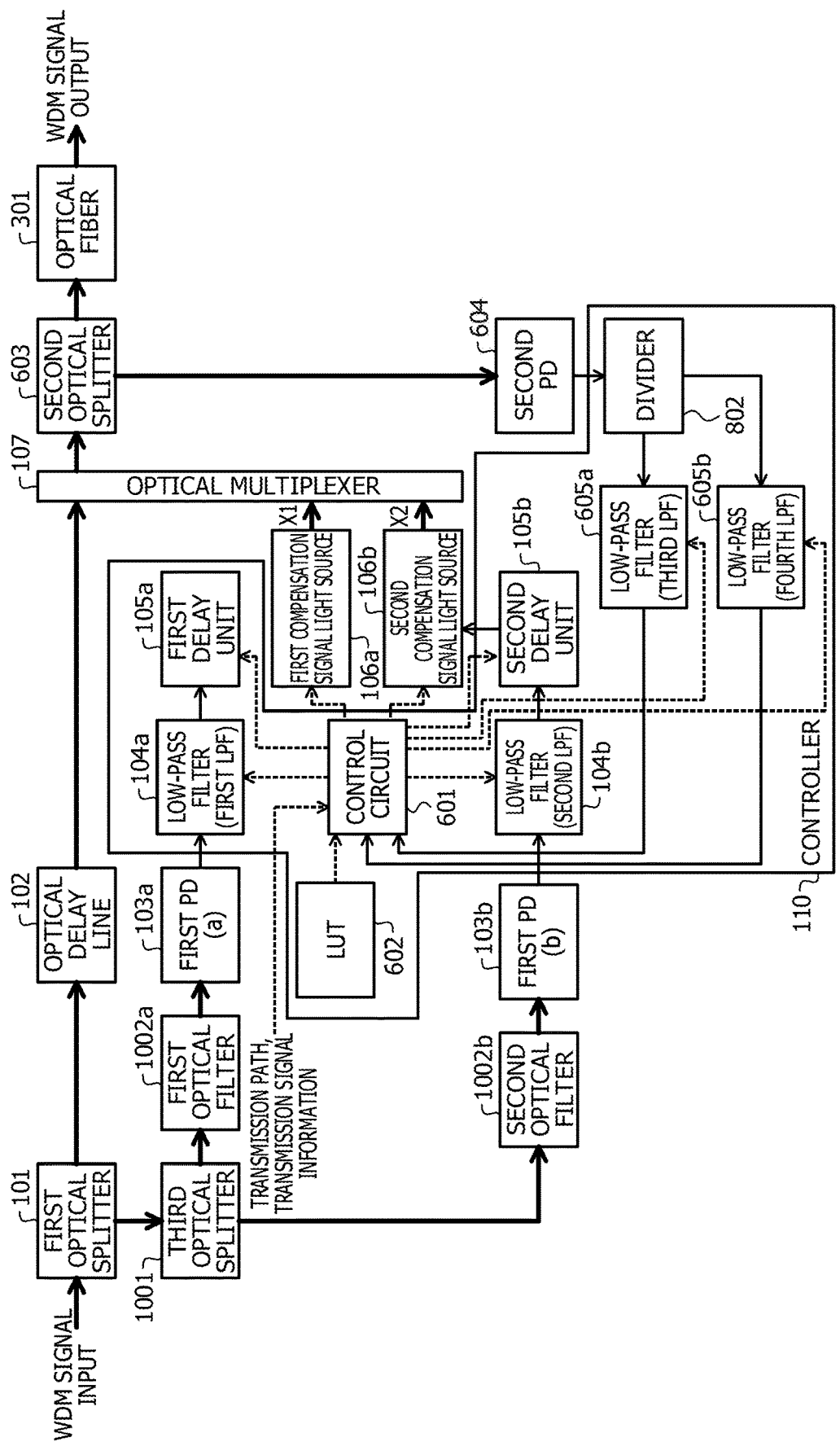
FIG. 10 illustrates an exemplary configuration of the optical phase distortion compensating device according to a fifth embodiment.

FIG. 10 illustrates an exemplary configuration of the optical phase distortion compensating device according to a fifth embodiment. According to the fifth embodiment, similarly to the fourth embodiment, control for addressing low-speed optical intensity variation in the transmission path is performed so as to further reduce optical phase distortion. The configurations of prestages of two routes of the first LPF and the second LPF are different.

In addition to the configuration of the fourth embodiment, a third optical splitter 1001, a first optical filter 1002a and a second optical filter 1002b, and a first PD (a) 103a, a first PD (b) 103b are included according to the fifth embodiment.

The third optical splitter 1001 bifurcates a light of the WDM signal output from the first optical splitter 101. For one of the bifurcated lights, the first optical filter 1002a having a predetermined transmission wavelength is provided. The one bifurcated light is detected by the first PD (a) 103a. Output of the first PD (a) 103a is input to the first LPF 104a. For the other bifurcated light, the second optical filter 1002b having a different transmission wavelength from the transmission wavelength of the first optical filter 1002a is provided. The other bifurcated light is detected by the first PD (b) 103b. Output of the first PD (b) 103b is input to the second LPF 104b.

The similar operational effects obtained according to the fourth embodiment may be obtained according to the fifth embodiment. Furthermore, according to the fifth embodiment, the WDM signal provided with different transmission characteristics of different optical wavelengths by the first optical filter 1002a and the second optical filter 1002b is transmitted through the first LPF 104a and the second LPF 104b. Thus, two different compensation signal lights X1, X2 are able to be generated by using the transmission characteristics of the first optical filter 1002a and the second optical filter 1002b in addition to the transmission characteristics of the first LPF 104a and the second LPF 104b. Accordingly, types of transmission characteristics may be increased. Furthermore, even when the first LPF 104a and the second LPF 104b are configured with analog circuits, given transmission characteristics may be obtained. Thus, according to the fifth embodiment, optical phase distortion occurring in the transmission path may be further effectively compensated compared to the fourth embodiment.

Sixth Embodiment

Figure 11:
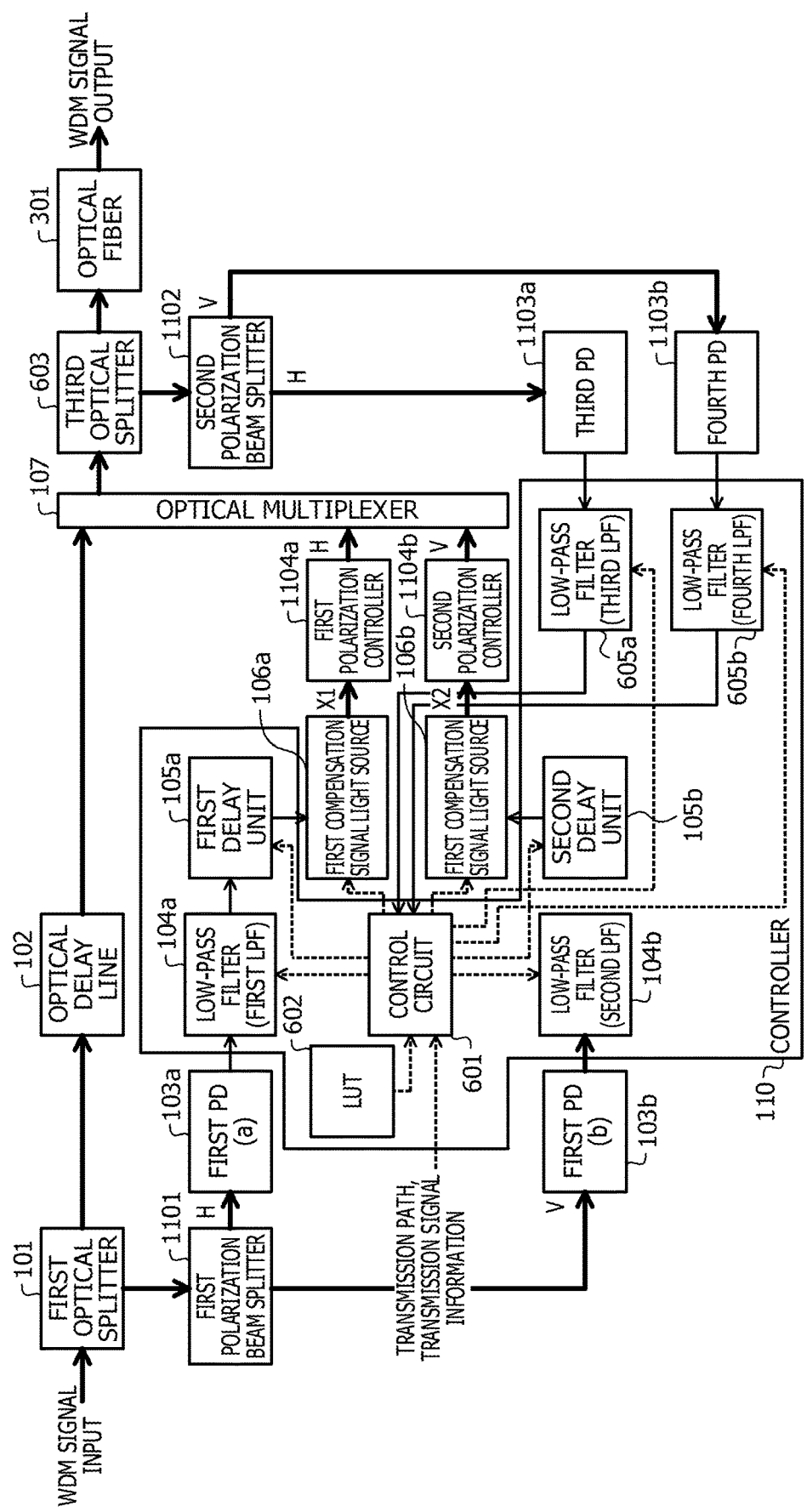
FIG. 11 illustrates an exemplary configuration of the optical phase distortion compensating device according to a sixth embodiment.

FIG. 11 illustrates an exemplary configuration of the optical phase distortion compensating device according to a sixth embodiment. According to the sixth embodiment, similarly to the fifth embodiment, control for addressing low-speed optical intensity variation in the transmission path is performed so as to further reduce optical phase distortion by also addressing a polarization multiplex WDM signal.

As different elements from the elements of the fifth embodiment, first polarization beam splitter 1101 and the second polarization beam splitter 1102 serving as polarization splitter units, a third PD 1103a and a fourth PD 1103b, and a first polarization controller 1104a and a second polarization controller 1104b are provided according to the sixth embodiment. Although description of the third optical splitter 1001 and the first optical filter 1002a and the second optical filter 1002b having been described for the fifth embodiment is omitted, these elements may be added.

The first polarization beam splitter 1101 splits output of the first optical splitter 101 into polarized waves H, V perpendicular to each other and outputs the polarized waves H, V. The WDM signal of the H polarized component split and output by the first polarization beam splitter 1101 is output to the first PD 103a, and the WDM signal of the V polarized component split and output by the first polarization beam splitter 1101 is output to the second PD 103b.

The second polarization beam splitter 1102 provided in the FB route splits output of the second optical splitter 603 into polarized waves H, V perpendicular to each other and outputs the polarized waves H, V. The WDM signal of the H polarized component split and output by the second polarization beam splitter 1102 is output to the third PD 1103a, and the WDM signal of the V polarized component split and output by the second polarization beam splitter 1102 is output to the fourth PD 1103b. Output of the third PD 1103a is output to the third LPF 605a, and the output of the fourth PD 1103b is output to the fourth LPF 605b.

The first polarization controller 1104a controls the polarized wave of the H component of the compensation signal light X1 output from the first compensation signal light source 106a. The second polarization controller 1104b controls the polarized wave of the V component of the compensation signal light X2 output from the second compensation signal light source 106b. The first polarization controller 1104a and the second polarization controller 1104b stabilize polarized states of the H and V components of the compensation signal lights X1, X2.

The similar operational effects obtained according to the fifth embodiment may be obtained according to the sixth embodiment. Furthermore, according to the sixth embodiment, optical phase distortion of the polarized components of the polarization multiplex WDM signal is able to be compensated. Thus, according to the sixth embodiment, optical phase distortion occurring in the transmission path may be further effectively compensated compared to the fifth embodiment. The polarization splitting described according to the sixth embodiment is not limited to the configuration illustrated in FIG. 11 and is able to be applied to the first to fifth embodiments. When the polarization splitting is applied to the embodiments and the compensation signal light sources are provided for respective polarized waves, optical phase distortion of each polarized wave of the perpendicularly polarized WDM signal is able to be compensated.

According to the above-described embodiments, when the optical modulation is performed with the optical fiber, optical phase distortion may be compensated in terms of a distributed constant and optical phase distortion occurring in a wide transmission band may be compensated. Furthermore, since a special phase modulator such as an $LiNbO_3$ (LN) optical phase modulator is not required, insertion loss may be reduced. According to the embodiments, an optical fiber or an optical fiber serving as the transmission path is used as the phase modulator, and the compensation signal light serving as a modulation signal combined with the WDM signal propagates through the optical fiber. Thus, optical phase distortion occurring in the WDM signal may be effectively compensated. The compensation signal light may be easily set to any of the wavelengths except for the wavelength of the WDM signal to be transmitted. For example, the compensation signal light may be set to a short wavelength, a long wavelength, a spacing between the WDM channels, an empty channel of the WDM signal, or the like.

For example, intensity variation of the transmitted WDM signal is detected, the compensation signal light exhibiting intensity variation in opposite phase is generated, the WDM signal is combined with the compensation signal light, thereby optical phase distortion is compensated without causing additional loss in the WDM signal transmitted through the optical fiber serving as the transmission path. Furthermore, the wavelength, chirp, and so forth of the compensation signal light are adjusted. Thus, optical phase distortion may be more effectively compensated. Furthermore, the WDM signal having been multiplexed is monitored and feedback control is performed on the multiplexed WDM signal. Thus, the optical intensity of the compensation signal light may be appropriately adjusted to address temporal variation of optical intensity of the compensation signal light. Furthermore, a plurality of compensation signal lights of different wavelengths are generated so as to be combined with the WDM signal. Thus, by combining the transmission characteristics of the LPFs and the optical filters, a compensation signal light having a given characteristics (opposite phase to the intensity variation of the input WDM signal) is able to be generated. Thus, optical phase distortion may be effectively compensated.

According to the above-described embodiments, two routes of the low-pass filters, the compensation signal light sources, and further, the optical filters are provided so as to generate two different compensation signal lights of different wavelengths. However, this is not limiting. As the compensation signal lights, three or more different lights of different wavelengths may be generated. This may suppress optical phase distortion more effectively.

The method of compensating optical phase distortion having been described according to the embodiments is able to be realized by executing a prepared control program in a computer (such as a CPU) of a target device (the above-described optical phase distortion compensating device) or the like. This control program is recorded in a computer-readable recording medium such as a magnetic disk, an optical disk, a Universal Serial Bus (USB) flash memory and executed when the computer reads the recording medium. The control program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical phase distortion compensating device compensating optical phase distortion of an optical signal, the optical phase distortion compensating device comprising:
    at least one detector configured to detect intensity variation of the optical signal;
    at least one filter configured to extract a band where the optical phase distortion is generated from a component of the intensity variation of the optical signal;
    a control circuit configured to generate, based on an extraction with the at least one filter, a compensation signal exhibiting temporal intensity variation of an input optical signal;
    at least one compensation signal light source configured to output, based on the compensation signal, a compensation signal light exhibiting intensity variation in opposite phase to the temporal intensity variation of the input optical signal and having a different wavelength from a wavelength of the optical signal;
    an optical multiplexer configured to output to a transmission path the optical signal and the compensation signal light; and
    a nonlinear medium that is connected to an output of the optical multiplexer and that is configured to cause optical phase modulation to occur.

2. The optical phase distortion compensating device according to claim 1, wherein
    the at least one filter is a low-pass filter configured to detect intensity variation of a component that is slower than a threshold.

3. The optical phase distortion compensating device according to claim 1, further comprising:
    an optical splitter unit configured to split the input optical signal;
    an optical delay line that is provided for one of split optical signals resulting from the splitting by the optical splitter unit and that is configured to delay the optical signal by a predetermined amount; and
    a delay unit, wherein
    the at least one detector and the at least one filter are provided for another of the split optical signals resulting from the splitting by the optical splitter unit, and wherein
    the delay unit is configured to delay output of the at least one filter by a predetermined amount and output to the at least one compensation signal light source the compensation signal with a delay matched to the delay amount of the optical signal.

4. The optical phase distortion compensating device according to claim 1, wherein
    the at least one compensation signal light source is configured to output the compensation signal light having at least one predetermined wavelength out of a wavelength not used for a channel of the optical signal, a wavelength of an empty channel of the optical signal, and a wavelength outside a communication wavelength band of the optical signal.

5. The optical phase distortion compensating device according to claim 1, wherein
    the control circuit has a setting section that allows setting therein of values of a bandwidth of the at least one filter, a delay amount for delay matching between the optical signal and the compensation signal light, the wavelength of the compensation signal light, and a chirp amount of the compensation signal light in accordance with a type of the transmission path through which the optical signal is transmitted and a type of the optical signal, and the setting section holds the set values, wherein the compensation signal is generated in accordance with the set values based on input of the type of the transmission path through which the optical signal is transmitted and the type of the optical signal.

6. The optical phase distortion compensating device according to claim 1, further comprising:
an optical splitter unit configured to split the optical signal output from the optical multiplexer;
a second detector configured to detect optical intensity of the optical signal split by the second optical splitter unit; and
at least one second filter configured to extract from a component of intensity variation of feedback detected by the second detector a band where most of the optical phase distortion occurs, wherein
the control circuit adjusts the generation of the compensation signal based on output of the at least one second filter.

7. The optical phase distortion compensating device according to claim 6, further comprising:
a divider configured to split output of the at least one detector, wherein
the at least one filter includes a plurality of filters, and the at least one compensation signal light source includes a plurality of compensation signal light sources, wherein
the splitting performed by the divider provides routes, wherein
each of the routes provided by the splitting performed by the divider is provided with a corresponding one of the plurality of filters and a corresponding one of the plurality of compensation signal light sources, wherein
the optical phase distortion compensating device further includes a second divider configured to split the output of the second detector, wherein
the at least one second filter includes a plurality of second filters, wherein
the splitting performed by the second divider provides routes, wherein
each of the routes provided by the splitting by the second divider is provided with a corresponding one of the plurality of second filters, wherein
the controller is configured to control the plurality of filters and the plurality of compensation signal light sources so as to output a control signal that causes the plurality of compensation signal light sources to output a plurality of the compensation signal lights different from each other, and wherein
generation of the plurality of compensation signal lights is adjusted based on output of the plurality of second filters.

8. The optical phase distortion compensating device according to claim 1, further comprising:
an optical splitter unit; and
a second optical splitter unit configured to optically split output of the optical splitter unit; and
a plurality of optical filters, wherein the optical splitting performed by the second optical splitter unit provides optically split routes, wherein
each of the optically split routes is provided with a corresponding one of the plurality of optical filters, wherein
the plurality of optical filters are configured to allow rays of the optical signal to pass therethrough at respective different wavelengths, wherein
the at least one detector includes a plurality of detectors, and wherein
each of the plurality of detectors is configured to detect intensity variation of a ray of the optical signal output from a corresponding one of the plurality of optical filters and output the intensity variation to the at least one filter.

9. The optical phase distortion compensating device according to claim 1, further comprising:
a polarization splitter unit configured to split output of an optical splitter unit into polarized waves perpendicular to each other so as to be output, wherein
the at least one compensation signal light source includes a plurality of compensation signal light sources, and wherein
the control circuit causes the plurality of compensation signal light sources to output compensation signal lights for respective polarized waves.

10. The optical phase distortion compensating device according to claim 9, further comprising:
a second polarization splitter unit configured to split output of a second optical splitter unit into polarized waves perpendicular to each other so as to be output; and
a plurality of second detectors configured to detect the output of the second polarization splitter unit for each of the polarized waves, wherein
the controller is configured to adjust generation of a plurality of the compensation signals for the respective polarized waves based on output of a plurality of second filters for the respective polarized waves connected to the plurality of second detectors.

11. A method of compensating optical phase distortion compensating optical phase distortion of an input wavelength-division multiplexed optical signal, the method comprising:
detecting intensity variation of the optical signal;
extracting from a component of the intensity variation a band where the optical phase distortion occurs;
generating, based on an extraction, a compensation signal exhibiting temporal intensity variation of the input optical signal;
outputting, based on the compensation signal, a compensation signal light exhibiting intensity variation in opposite phase to the intensity variation of the input optical signal and having a different wavelength from a wavelength of the optical signal;
outputting to a transmission path a signal light formed by combining the optical signal and the compensation signal light; and
causing a nonlinear medium connected to an output of an optical multiplexer to cause optical phase modulation.

* * * * *